Figure 1:
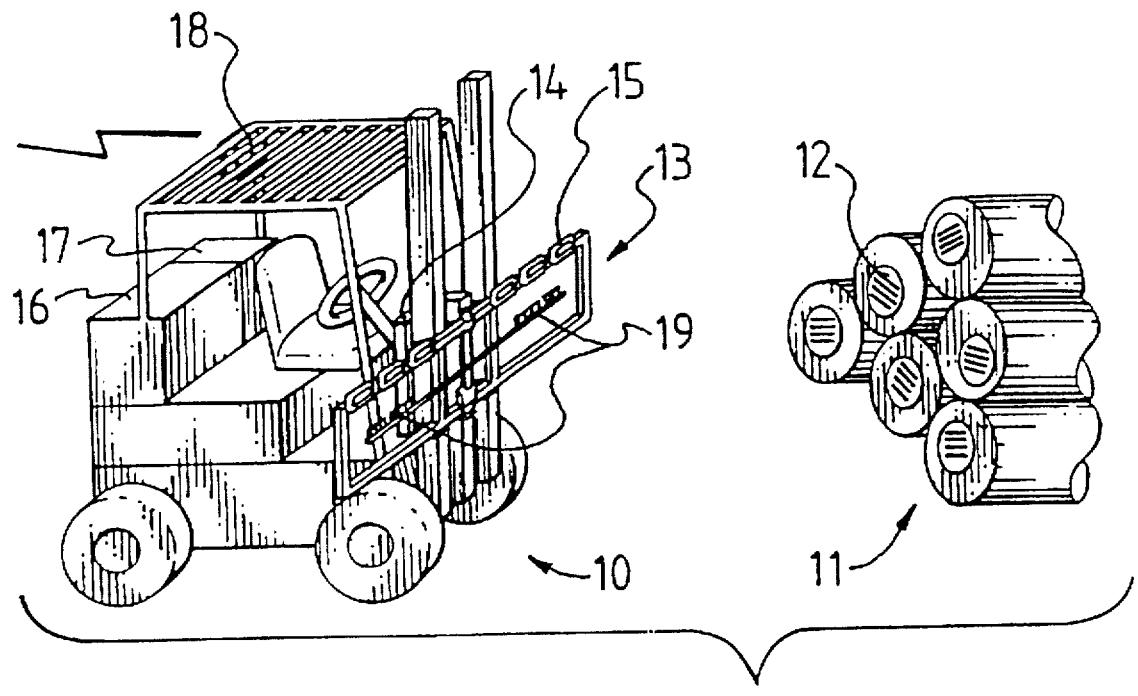

United States Patent [19]

Salive et al.

[11] Patent Number: 5,725,253
[45] Date of Patent: *Mar. 10, 1998

[54] IDENTIFICATION SYSTEM

[75] Inventors: Harold Terrence Salive; Kevin George Slade; Rachel Keene Salive, all of Auckland, New Zealand

[73] Assignee: Kiwisoft Programs Limited, Auckland, New Zealand

[*] Notice: The term of this patent shall not extend beyond the expiration date of Pat. No. 5,607,187.

[21] Appl. No.: 691,823

[22] Filed: Aug. 5, 1996

Related U.S. Application Data

[63] Continuation of Ser. No. 199,316, Mar. 3, 1994, Pat. No. 5,607,187.

[30] Foreign Application Priority Data

Oct. 9, 1991 [NZ] New Zealand ............... 240172

[51] Int. Cl.$^6$ .................................. B42D 15/00
[52] U.S. Cl. .................. 283/67; 283/70; 283/74; 283/81; 235/375; 235/462
[58] Field of Search ................. 283/74, 70, 75, 283/81, 67; 235/462, 375

[56] References Cited

U.S. PATENT DOCUMENTS

| 4,776,464 | 10/1988 | Miller et al. | 235/462 X |
| 5,103,489 | 4/1992 | Miette | 382/101 |
| 5,607,187 | 3/1997 | Salive | 283/67 |

*Primary Examiner*—Frances Han
*Attorney, Agent, or Firm*—Young & Thompson

[57] ABSTRACT

An identification system involves the labeling then tracking of grouped items such as logs, shipping containers, or packets of mail and reporting the current location of identified items during transport, processing, and storage. Machine-readable labels are provided, adapted for recognition and reading from within a cluttered scene. These labels have bordering indicia—used for locating purposes—distinguishable from inner informative indicia. Bordering indicia include either a series of small substantially similar marks like filled or hollow ovals, or one circle, or part of a circle, or a sequence of locating symbols or characters. Informative indicia include dots, bars, rings, or regional text characters. Multiple coding methods and spatial (e.g. Latin Square) replication of indicia are used to minimize errors. A machine-vision image decoder comprises a high-resolution camera adapted for field use and a remote image processing computer to analyze the image and make reports listing or showing items within the image as identified by labels.

12 Claims, 6 Drawing Sheets

FIGURE 10
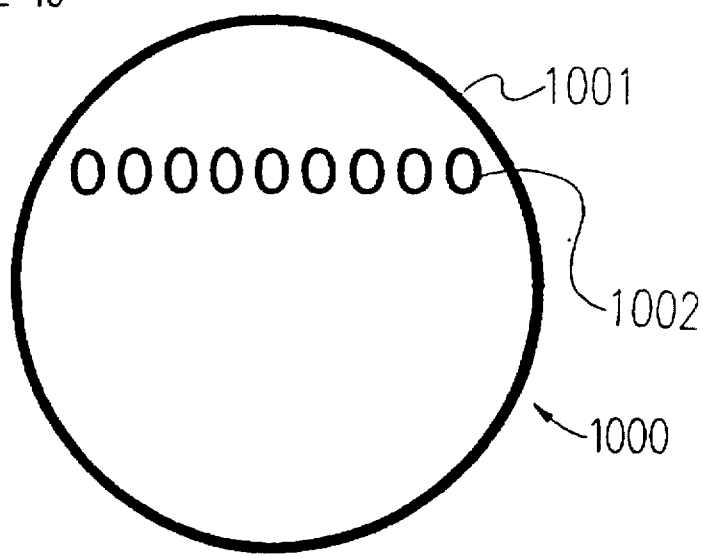
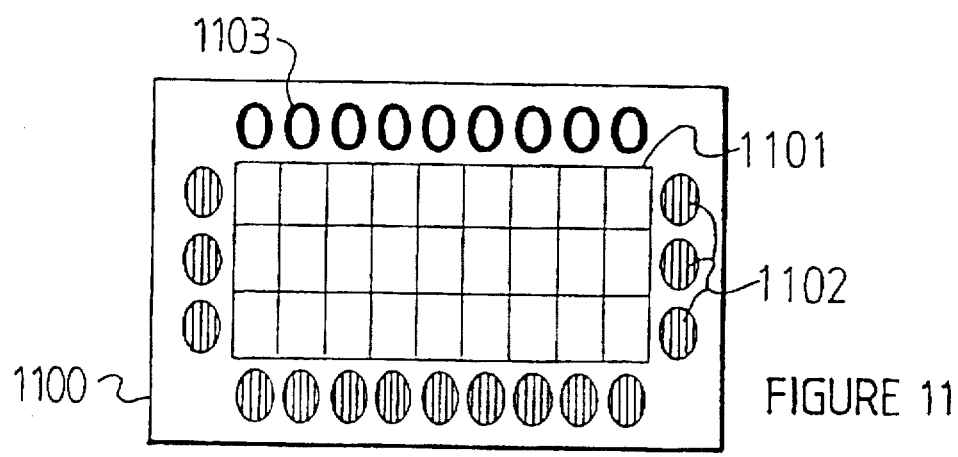
FIGURE 11
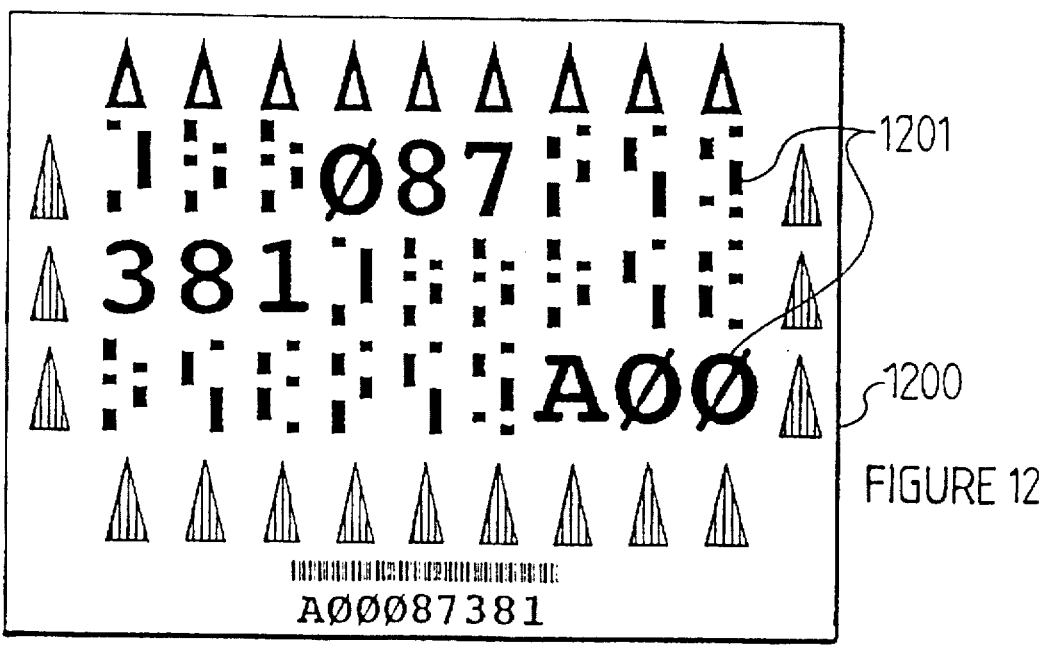
FIGURE 12

IDENTIFICATION SYSTEM

This application is a continuation of application Ser. No. 08/199,316, filed Mar. 3, 1994, now U.S. Pat. No. 5,607,187.

FIELD

This patent relates to digital image acquisition and subsequent recognition and decoding of machine-readable characters and/or coded indicia printed onto labels to be affixed to, or printed directly onto fixed or transportable objects.

BACKGROUND

Although a number of systems exist for providing one-by-one identification of data carried on passing objects or identifying locations of objects and then acting on the information found, (such as at the point of sale in a supermarket) there is still a need for a system capable of coping in one single capture action with a whole array of items that have come together at some point—which may be outdoors—in a storage or distribution network. Preferably analysis and reporting are also fully integrated into the system.

For example, there is a need for firstly the identification and secondly the convenient and preferably automatic recording of logs and processed timber at various points during transportation, processing, and storage.

OBJECT

It is an object of this invention to provide an improved automatic identification and location-tracking system for objects viewed against complex backgrounds, or at least to provide the public with a useful choice.

STATEMENT OF INVENTION

In one aspect the invention provides a machine-readable label capable of being applied to an item, said label carrying contrasting indicia compatible with machine vision equipment wherein said indicia include at least one distinctive border marking which constitutes an outer border defining the area covered by an adjoining information-holding field, and said information-holding field is capable of containing a plurality of information-carrying indicia.

In another aspect the invention provides a method of identifying one or more items at a site, comprising the steps of:

labeling each of said one or more items with a machine-readable label, said label carrying contrasting indicia compatible with machine vision equipment, wherein said indicia include at least one distinctive border marking which constitutes an outer border defining the area covered by an adjoining information-holding field, and said information-holding field contains information-carrying indicia relevant to its respective item, recording at least one image of at least one labeled item at the site, converting the at least one image into a computer-compatible form, applying machine vision algorithms to detect the presence and position of each distinctive label border within each image, computing the location of each adjoining information-holding field, assessing the rotational orientation of each label, detecting and decoding information-carrying indicia within the label borders, to identify each item.

The identification label or symbol of this invention and/or the identification method of this invention are particularly suited to the labeling and tracking of groups of items such as logs. In the preferred embodiments of this invention logs are preferably initially identified at one or both ends with a unique label at a station, by ownership, location, handler, type, or quality. The unique label can carry information acting as an index to a data base. The image capture stage may be required during loading of a ship.

Other applications include the locating of items in a warehouse, from small boxes up to shipping containers, or the identification of passing vehicles from a distance or identification of fixed bin areas in a warehouse. On an item-by-item basis the system can be applied to mail at sorting stations where it can also serve to track mail during distribution.

Information derived from such a system may be used to categorize shipments, to prepare processing stations, or to pinpoint the whereabouts of each of many items during transport operations or in storage. Accurate identification can aid in efficient operation and production management and can help reduce stock loss.

The following embodiments are given by way of example only and are not intended to be limiting on the scope of the invention. Many variations or equivalents will be apparent to those skilled in the art.

DRAWINGS

In the description of the drawings, reference will be made to filled black areas such as black circles, ovals, or triangles. However, the blackness is illustrated in the following figures with shading.

FIG. 1: This diagram shows a typical arrangement of mobile camera platform, and a bundle of labeled logs, at the time of image capture in a dockside environment.

Figure 2:
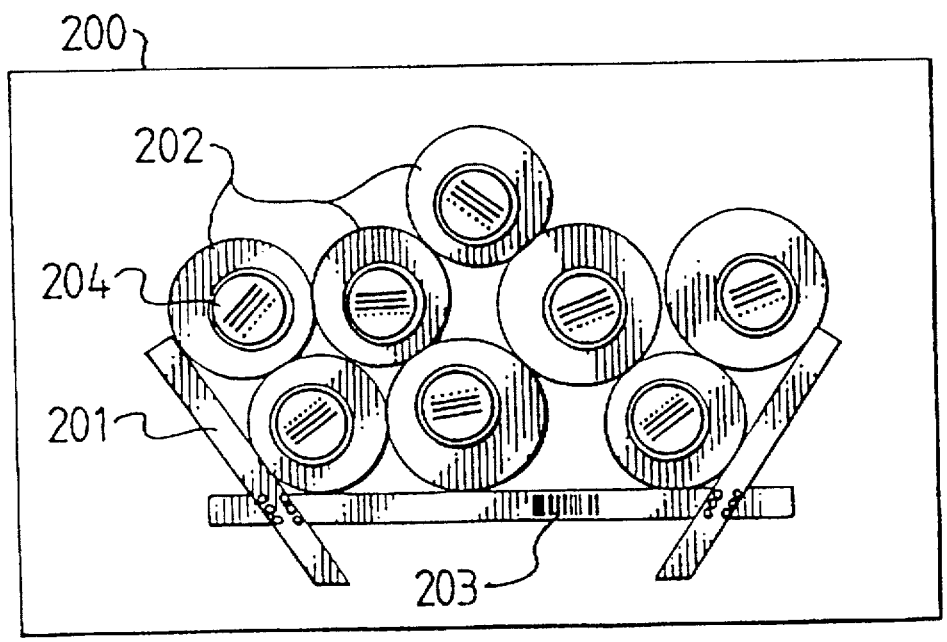

FIG. 2: This diagram shows the contents of a single entire captured image, showing a bundle of bunted logs on a stacking cradle.

Figure 3:
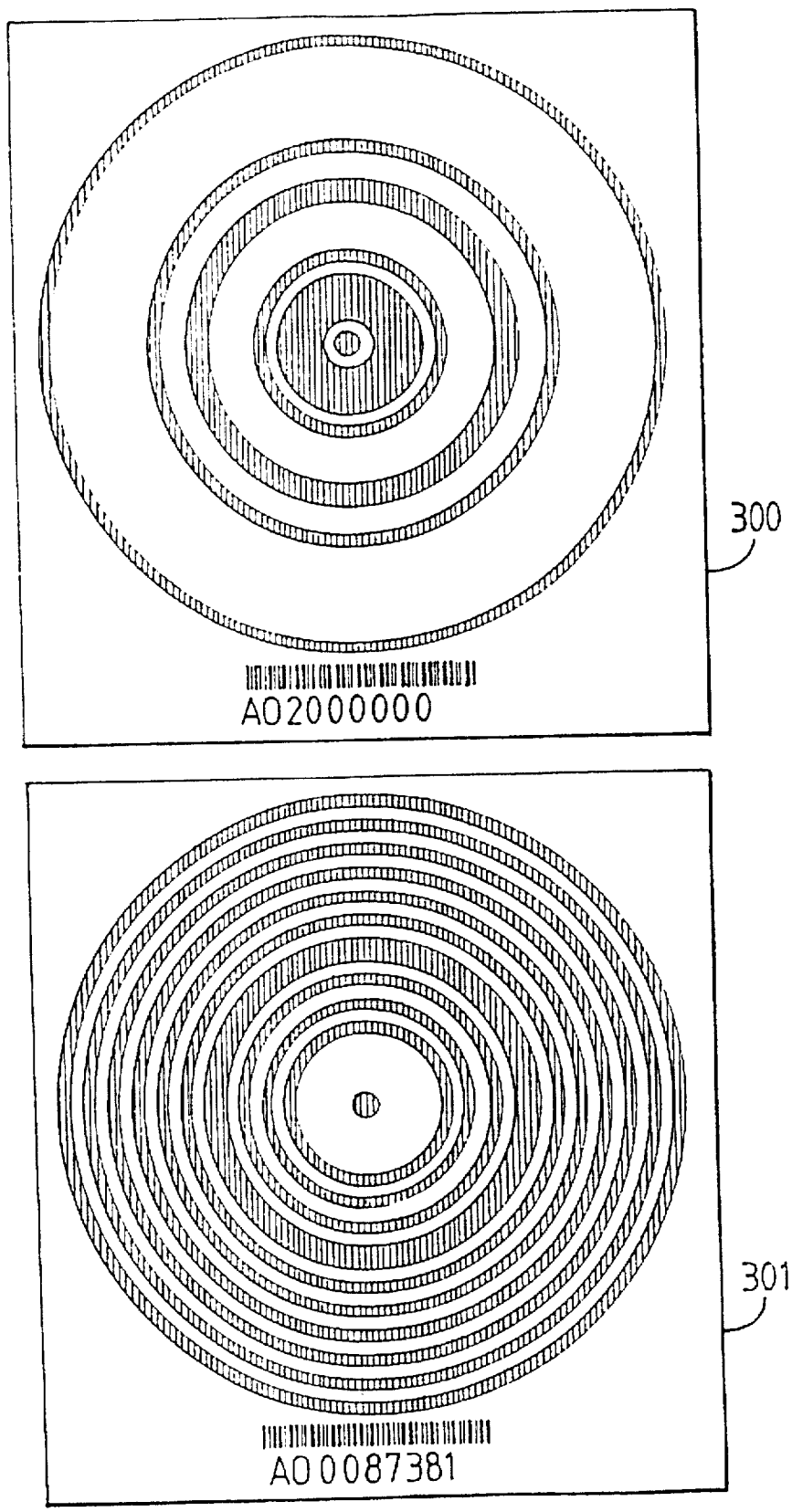

FIG. 3: This diagram shows examples of encoded labels with an outer fixed circular frame, about a concentric form of barcode markings. The lower label shows an example of a circular barcode label having information corresponding to that of FIG. 4 and FIG. 5. Each label has an outer black control ting, a middle black control ring, and a central black point. Black and white lines have equal thickness in the preferred coding scheme.

Figure 4:
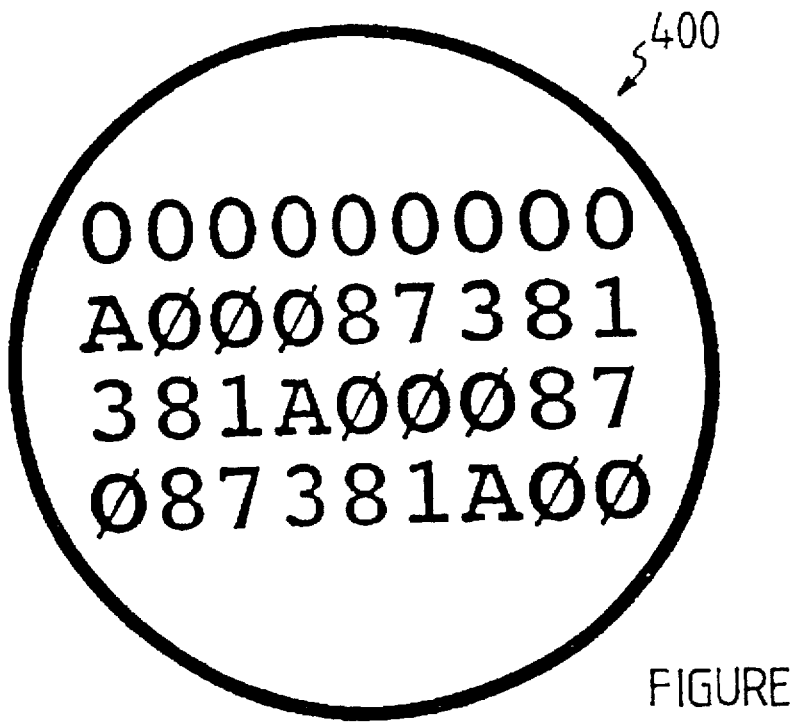

FIG. 4: This diagram shows an encoded label, which contains alphanumeric identification code, duplicated in a partial Latin Square form, with an orientation-providing row of open circles above the information-carrying indicia, and a surrounding frame of circular shape.

Figure 5:
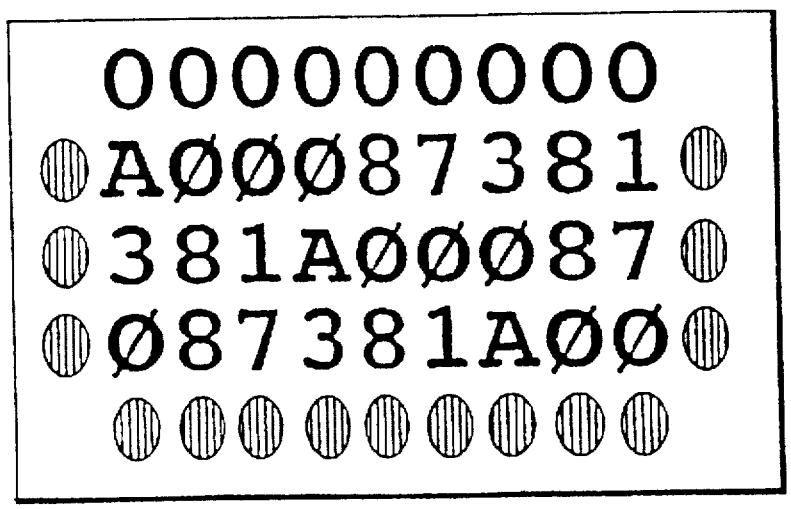

FIG. 5: This diagram shows an example of an alphanumeric encoded label having a frame of open and closed ovals arranged along straight lines which uniquely locate the outside of the label and specify the orientation of the label. The identification code within the label consists of nine alphanumeric characters and the code is repeated three times in a partial Latin Square form with spatial redundancy so that within any three columns the complete number appears.

Figure 6:
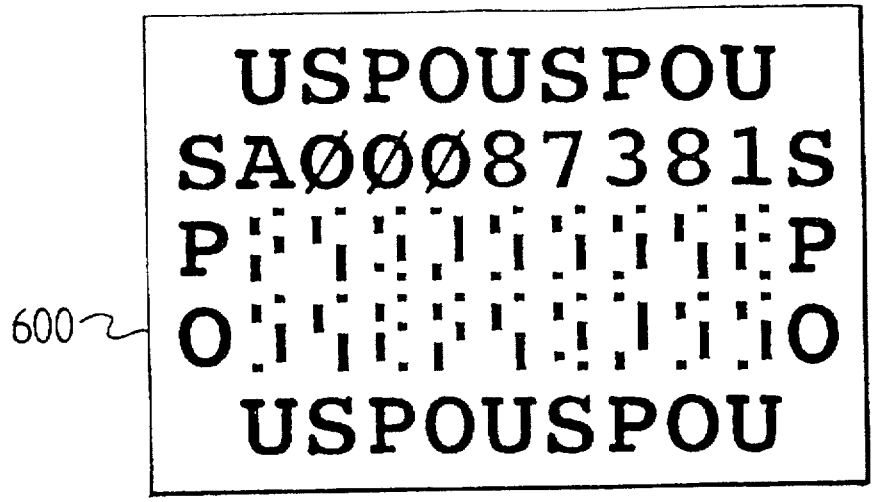

FIG. 6: This diagram shows an encoded label which contains alphanumeric codes and also a coded pattern of short and long bars incorporating parity bits and spatial redundancy within individual codes (each code accompanied by a complement of itself alongside) and with an outer frame of a pattern of symbols around both types of codes. The code is repeated three times in a partial Latin Square form with spatial redundancy so that within any three columns the complete number appears.

Figure 7:
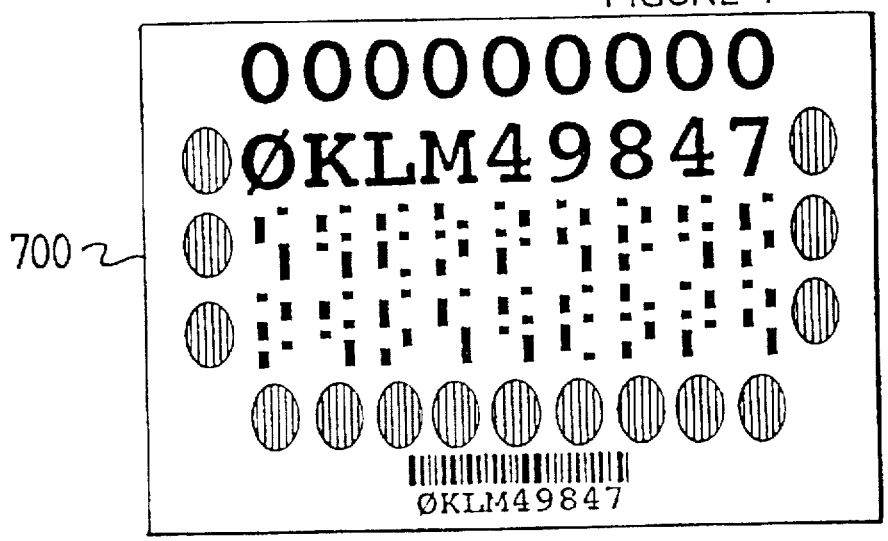

FIG. 7: This diagram shows an example label containing both alphanumeric codes and also patterned dots incorporating parity and spatial redundancy within individual codes and with an outer frame of a pattern of symbols around both types of codes. Each line contains a rotated set of codes so that within any three character columns the complete number appears.

Figure 8:
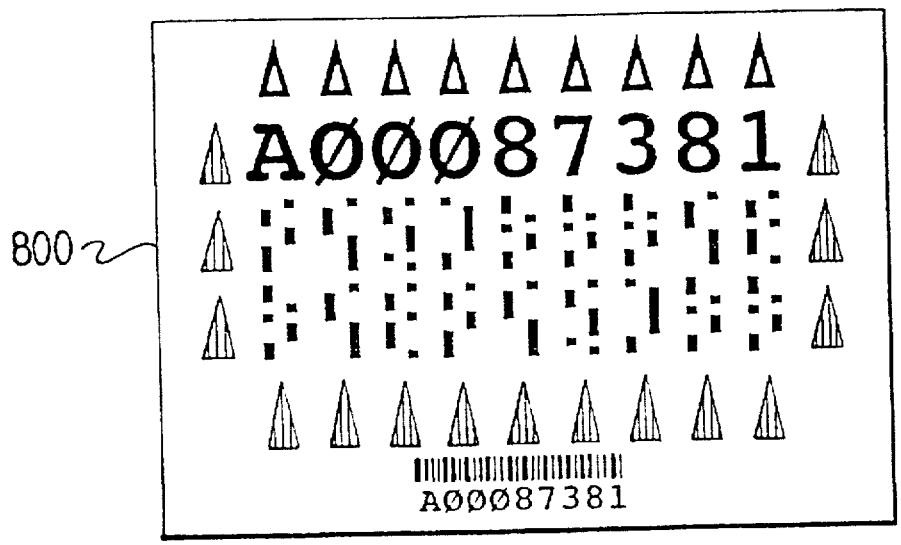
Figure 9:
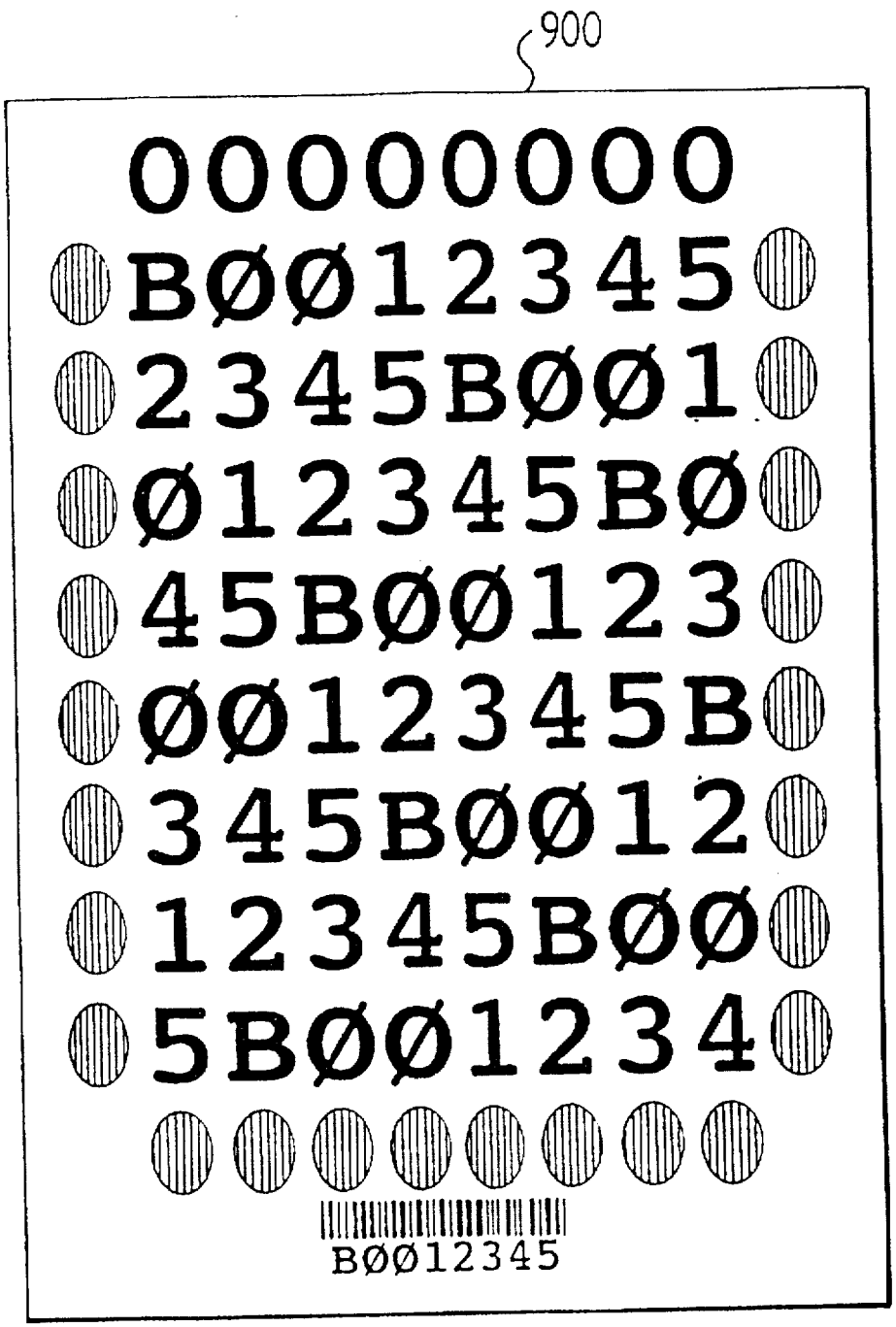

This example—as does FIGS. 3, 8 and 9—also provides a conventional bar code holding the same information, with text, outside the border. This is useful where goods may also need to be tracked with a conventional bar code, as read by a hand reader or in other existing ways. It is also useful where an existing bar code system is to be run in parallel, at least during a transition period.

FIG. 8: This diagram shows an encoded label which contains both alphanumeric codes and also a coded pattern of short and long bars incorporating parity and spatial redundancy within individual codes (a complement of the code alongside) and with an outer frame of symbols (triangles in both open and closed styles) around both types of codes. The code is repeated three times in a Latin Square form with spatial redundancy so that within any three columns the complete number appears.

FIG. 9: This diagram shows an example of an alphanumeric encoded label which uses a frame of open and closed ovals which uniquely locate the outside of the label and specify the orientation of the label. The identification code within the label consists of eight alphanumeric characters and the code is repeated eight times in a complete Latin Square form with spatial redundancy so that within any column and most sub-areas containing 8 characters, the complete identification code appears.

FIG. 10: This diagram shows an example of a user-printable label having a border, a line forming a circle, and an orientation indicium which is shown as a row of open ovals. This is a pre-printed label to which information-carrying indicia may be added by the user at the time of use—such as at the time of item classification.

FIG. 11: This diagram shows an example of an alphanumeric encoded label without informative indicia; having a frame of open and closed ovals which surrounds a blank information-carrying space; this is another pre-printed label. This label also bears registration marks to aid in accurate location of indicia.

FIG. 12: This example label illustrates a mixture of two codes; one human-readable and one machine-readable, mixed together within a 3×9 modified Latin square replication. The bar-code marking below may be used to (for example) aid in the transition from an older recording method.

PREFERRED EMBODIMENTS

EXAMPLE APPLICATION USING CIRCULAR ENCODED LABELS

In one embodiment circular encoded labels are used in identifying objects during or after handling, such as the ends of rods, pipes, bottles or logs which have no normal single positional (rotational) orientation.

In this example we prefer to use fixed-width tings as a representation for a number. An outermost set of three rings has preferably the radially second of the three shaded in a color contrasting with the other two rings to provide a frame of reference for locating the circular encoded label within a complex image.

Optionally, additional control rings can be used for error checking purposes. For example the black border ring (represented by shading) can be an outer control ring, there can be a middle control ring, and a central control point. The software uses these as checks that the symbol has been scanned correctly.

An application for such a circular encoded label is the identification of logs and subsequent automatic recognition of the log by locating the circular frame and reading the circular encoded label.

As each log is documented on arrival at a marshaling yard a seven digit number is assigned to the log. A computer generates copies of a label, perhaps an 18 cm diameter circular black barcode pattern of the number on a sheet of white plastic. Label indicia are as indicated in FIG. 3. In this example individual rings are 3 mm wide. The plastic sheets are then stapled preferably to both ends of the appropriate log.

When a grab subsequently picks a load of logs and carries them across to load on a ship or truck for shipment, the grab is routed across a recording area first. The recording area positively forces the grab to move to the scanning position where the grabber is then stopped by blocks. A set of flood lights is then automatically turned on and one end of the set of logs is scanned with all logs in the jaws of the grab being scanned at once. At the end of the scan, the lights are turned off and the blocks are removed. The grab then proceeds to deliver the logs to the truck or ship.

Alternatively, and as shown in FIGS. 1 and 2, a mobile recording platform 13 mounted on a vehicle 10 equipped also with flood lights 15, a power source 16, dual camera/rangefinder units 19, and a computer 17 coupled to a control box 14 may be used to approach a bundle of logs 12, 202, previously placed on a cradle 201 by a grab and preferably bunted by a mobile ram into approximate alignment. The recording platform captures an image or a composite image 200 of one end, then moves to the other end and captures a second image. The information is transmitted by wireless 18 to a remote analysis station.

A typical image holds a content similar to that of FIG. 2, though with more background clutter. The image 200 has sufficient resolution to allow decipherment of each label 204 on each item (here logs, 202). A label of the type used in this drawing is reproduced as FIG. 4. Preferably the cradle 201 also bears identifying visual or wireless sensing indicia such as bar codes or radio identification tags 203 in order to locate the whereabouts of the items at the time of recording. Note that the preferred pixel density is much finer than the squares included in the pattern used to indicate wood at the end of each log. A typical line-scan camera has a 3456-photodiode CCD linear array giving 3456-pixel columns, and preferably 11,200 rows are assembled for one image. A typical area-capture camera has a 4096×4096 photodiode CCD array giving 4096 pixel columns and 4096 rows in each captured image taken of a section of the cradle and assembled into a full picture of the cradle.

The entire scanned image is analyzed by computer to locate all label frames and identify the logs based on the information within each label. In the case of circular barcodes (300, 301), the circularity of the encoded label provides redundancy of information by allowing several alternative values to be calculated from analysis of different radial segments. In the case of alphanumeric codes, the indicia representing the code are repeated several times. A Latin Square replication method is preferred, as it is statistically sound. Multiple redundancy provides safeguards against information loss due to degradation of the encoded label due to dirt or other contamination or CCD element failures. Multiple code types provide safeguards against misinterpretation by a single analysis routine.

The captured image is compressed and transmitted by radio 18 to a remote computer station (not shown) for storage, subsequent analysis, and later viewing. An analysis computer program automatically retrieves the stored image, analyses the image and generates a file of decoded identification codes for the image.

According to this invention, pre-printed labels might be supplied with markings as in the example of FIG. 10, and on a preferred type of paper material. One such preferred material is a plastics-filled paper with a matt surface, which tolerates the heat applied during toner fusing during laser printing. This label, 1001, has a line forming a circle, and an orientation indicium 1002 which is the row of open ovals which is intended to lie above the information-carrying indicia.

Alternatively one might use a pre-printed label 1100 in the style of FIG. 11 which has compact indicia 1102 as a border. Again, a row of open ovals 1103 serves as an orientation mark. This label also bears registration marks 1101 to aid in accurate location of the information bearing indicia represented by grid 1101.

EXAMPLE APPLICATIONS USING ALPHANUMERIC AND MARK CODES

FIG. 4 shows alphanumeric characters (it is the label shown as 204 in FIG. 2) inside a circular frame or border 400. While the border itself does not indicate the orientation of the information, a secondary border comprising a row of open ovals above the text does.

The embodiments as shown in FIGS. 4 to 9 and 12 employ labels having alphanumeric identification codes and incorporating spatial redundancy. Those of FIGS. 5, 7, 9 and 12 are each surrounded by a frame comprising a series of open and closed ovals. FIG. 6 uses a border composed of characters, and FIG. 8 uses open and closed triangular symbols. Our order of preference for frame indicia in terms of computer recognition suitability is ovals, then triangles, then characters. FIG. 12 illustrates a label 1200 containing a mixture of code types 1201 within a 3×9 modified Latin square spatial replication.

Any of the labels of FIGS. 3 to 9 or FIG. 12 are suitable for use in identifying objects during or after handling such as, individual or groups of logs, pallets of timber, and individual or stacks of boxes.

The small repetitive characters preferred for our border indicia are easy to recognise by means of machine-vision algorithms scanning a large array systematically, looking for identifiable labels. The series of indicia—or even arcs or a complete circle—are preferable to straight line frames because they define the whereabouts of the accompanying information more clearly and because they are easier to locate than straight lines. Arcs can be located from the analysis of only two rows or columns; lines require more rows and columns and also end-points to distinguish them from arcs. For instance, single straight lines are hard to locate, are commonly found in image backgrounds, and the site of the information is still possibly on one side or the other. Pattern-matching algorithms, for example, can be used to locate distinctive characters such as these which are chosen at least in part for their relative rarity in the world outside one or more labels. Ovals and more so triangles intrinsically indicate orientation.

In the case of this illustrative example, (and in particular for the case of circular coded labels as shown in FIG. 3) the attached labels 204 are to be differentiated from growth rings of the logs 202 by (a) being within a frame of circles of contrasting color, and (b) having a greater contrast than growth rings have.

The encoded alphanumeric labels 400, 500, 700 and 900 use a row of open circles or ovals, such as the number '0', above a row containing the identification code. 800 uses triangles. On the ends of the row containing the identification code, a filled shape such as a filled '0' is preferably used as part of the frame. Except for 900, two additional code lines are printed below which contain the identification code in rotated spatial order and with the filled circles or ovals on the end. Below the third identification row, a row of filled symbols (part of the frame) is placed to positionally identify the code positions above. For 900, the row of eight identification characters is repeated with spatial rotation seven additional times to produce a complete Latin Square design. For 900 a row of filled symbols are placed below the eighth identification line to complete the enclosing frame.

Alphanumeric characters are selected from a fixed width font of European characters and contain character designs which are all easily distinguished from each other. Preferably a font in common use in the region (such as Cyrillic or Katakana in corresponding countries) is used as long as it is compatible with machine recognition. (In some fonts, some characters differ little from each other, such as the numeral 1, the lower case '1', or zero and the letter "O", and Q, in even a Courier font, which is preferred. These may be modified: for example the character represented as octal 370 in the "Postscript" set is a letter "l" with a cross on its stem, or alternatively at least one set of informative indicia printed in at least one different code helps resolve ambiguity).

The characters, of which there are typically nine, are commonly partially or wholly replicated in an m×n Latin Square design as exemplified in FIGS. 4 through 8 where m=3 and n=9 in these instances. In this format the entire code is replicated in the three horizontal rows below the locating frame, and is also replicated in any group of three columns. (FIG. 9 shows eight characters in an 8×8 complete Latin Square design.) Typically only a single Latin Square generating rule is used for all labels in a single application.

An application for such an alphanumeric encoded label is the identification of logs and subsequent automatic recognition of the log by locating the frame of ovals and reading the alphanumeric encoded label.

As each log is received at a marshaling yard, a nine character identification is assigned to the log. Upper case and lower case alphabetic characters as well as digits 0 to 9 are used in the identification code. In our preferred embodiment, a computer generates copies of a spatially balanced pattern of the identification on sheets of white plastic paper, 18 cm by 13 cm, surrounded by an identifying frame of ovals which also identify orientation. Individual alphanumeric characters are 15 mm high and at most 15 mm wide in a 15 mm wide space. Preferably a second simultaneously readable code representation in marks and spaces is also used in the label with spatial rotation to increase the likelihood of correct recognition in the later computer analysis. FIG. 7 shows such a coded label with an attached bar-code outside the frame to permit simultaneous use of another parallel method. The plastic sheets are affixed preferably to both ends of the log.

The scanned image after capture and transmission (see above —e g. FIG. 1) is automatically analyzed by computer to locate all label frames and identify the logs based on the encoded label value. The frame of ovals (or indeed a circular frame) allows identification and correction of planar skew (i.e. non-perpendicularity of the object planes to the optical axis) in the label image. The frame also allows easy determination of the rotational orientation of the image. The additional copies or repetitions of the identification code which are spatially separated allow reconstruction of the identification even after two thirds of the label is obscured due to degradation of the encoded label due to dirt or other contamination, or damage to the label, or due to CCD element, area, column, or row failures.

The captured image is preferably compressed and transmitted by radio to a remote computer station for storage, subsequent analysis, and later viewing. An analysis computer program automatically retrieves the stored image, analyses the image and generates a file of decoded identification codes for the image. A typical delay time between the commencement of image capture and completion of analysis can be as short as 33 seconds with commonplace computing equipment. Of course, image transmission may commence as soon as the first of the scanned data becomes available.

SOFTWARE

The following example shows a typical instruction sequence for control instructions for the log identification when a fixed location scanning station is available.

Control Instruction Sequence

1. Wait for a grab with logs to arrive at scanning station, and set up camera.
2. Initiate scan and save scanned image.

Then, for circular identification codes:

3. Analyze scan image to find all label frame circles.
4. Identify the center point of a first circle. (and optionally identify other control rings).
5. Read the code from outside to center at 0 degrees rotation as sample 1.
6. Read the code from outside to center at 120 degrees rotation as sample 2.
7. Read the code from outside to center at 240 degrees rotation as sample 3.
8. Reconcile samples to form identification number.
9. Transmit identification number to database software.
10. Repeat steps 4 to 9 for all other circles in scan.
11. Optionally, notify grab to proceed away from scanning station.
12. Go back to step 1.

Alternatively, for alphanumeric identification codes:

3. Analyze scan image to find all label frames.
4. Use the frame as recorded to indicate non-perpendicularity and correct it, removing orientation and rotation distortions.
5. Identify the character at each character position in the triple array of characters inside the frame.
6. Reconcile the three samples to form an identification.
7. Transmit identification number to database software.
8. Repeat steps 4 to 7 for all other frames in scan.
9. Notify grab to proceed away from scanning station.
10. Go back to step 1.

EXAMPLE POSTAL APPLICATION USING ALPHANUMERIC CODES

This preferred embodiment describes mixed alphanumeric and coded postal identification codes for destinations incorporating spatial redundancy and surrounded by a locating frame. They have been prepared for use in identifying postal letters, packages, boxes, and sacks.

The encoded labels may use a replicated sequence of letter groups, such as the set 'USPO' as the frame around a row or rows containing the identification code. One such label is shown in FIG. 6. Alternatively other types of symbol sequences providing orientation information may be used such as alternating circles and triangles.

On the ends of the rows containing the identification code, the frame code sequence is continued as part of the frame pattern. Two additional code lines are below in FIG. 6 which contain the identification code in a different code rule (such as "ASCII" code in which "mark" here is black and "space" is white or vice versa,) incorporating within-character spatial redundancy, parity error coding, and in rotated spatial order and with the continued frame pattern on each end. Alternatively the continued frame pattern on each end may use other symbols such as circles or triangles. Below the third identification row, another sequence of the same letter groups completes the frame around the identification codes. Alternatively, other symbols may be used below the third row, such as alternating circles and triangles.

Labels may be affixed to objects with any orientation and still be recognized because of the distinctive outer frame which also provides orientation information. Partially obscured labels can still be recognized because of the spatial duplication of the identification within the frame. Defaced labels can still be recognized since both a readable and a differently coded version of the label are used in the same label.

At the time the letter, parcel, or box is mailed, a label with frame may be generated by computer and affixed to the package automatically or manually. Alternatively the frame may be preprinted separately and the identification affixed inside the frame at mailing time. Guidemarks such as free lines or colored bars may be placed inside the frame to aid in alignment of the identification codes within the frame. FIG. 10 illustrates one example of an alphanumeric encoded label having a border according to this invention but with the information field left blank.

Handling is expected to involve separating each item on a moving belt so that only one item at a time passes a scan station. A line scan camera at the scan station is triggered by an object sensor to take a series of scans of the object as it passes in front of the camera. Once past the camera, the area scan image is analyzed by computer to determine the identification code for the destination and the code is passed to a sorting machine to provide directional routing for the moving item. Unidentified objects produce a dummy destination code intended to route them to postal staff for manual identification.

EXAMPLE LICENCE PLATE APPLICATION USING ALPHANUMERIC CODES

Vehicle licence plates which provide alphanumeric identification codes incorporating spatial redundancy and surrounded by a locating frame made according to this invention may be used on or directly applied to vehicles such as cars, trains, planes, boats, and to shipping containers to enable automatic scanning and reading of licence identification.

In one preferred format as shown in FIG. 5, the encoded alphanumeric labels use a row of open circles or ovals, such as the number '0' above a row containing the identification code. On the ends of the row containing the identification code, a filled oval or circle, such as a filled '0' is used as part of the frame. Two additional code lines are below which contain the identification code in rotated spatial order and with the filled circles or ovals on the end. Below the third identification row, a row of filled circles or ovals is placed positionally as part of the frame identifying the code positions above.

Plates can be manufactured, distributed and affixed in the same manner as previously but with the new codes and surrounding frame.

A camera or scanner can be used to take pictures of the items in their normal environment and automatically Analyze the picture to identify the one or more vehicles in the picture which can be located from the vehicle label frame and which produce eight dot or more wide single color areas at feature edges. The picture may preferably be printed to provide a permanent record with the identification, date, and time, along the edge of the print. Optionally the numbers may be transmitted by radio to a central machine for use in other application such as traffic counting, stolen vehicle checks, or licence currency checks.

EXAMPLE MEASUREMENT LABEL APPLICATION USING ALPHANUMERIC CODES

For commercial goods which require exterior coding of content details a label, incorporating spatial redundancy and surrounded by a locating frame, may be made for use on large containers, pallets of wood, shipping boxes, and other items.

The encoded alphanumeric labels are generated as required and coded with content information such as type, weight, quantities, color, destination, date, and other important information. Optionally the frames may be preprinted.

The encoded alphanumeric labels, which may be any of from FIG. 3 to FIG. 9 or FIG. 12, preferably use a row of open circles or ovals, such as the number '0' above a row containing the identification code. On the ends of the row containing the identification code, a filled circle, such as a filled '0' is used as pan of the frame. Additional code lines are below which contain the identification code in rotated spatial order and with the filled circles or ovals on the end. Below the last identification row, a row of filed circles or ovals is placed positionally as part of the frame identifying the code positions above.

At a special checking station the goods are to be categorized, weighed and measured. Unique labels incorporating the category, weight, measures, date, and identification code are automatically generated at the station (optionally onto preprinted frames) and affixed to the item in one or more places. All labels have the same frame.

At transit stations and at the final destination cameras or scanners take pictures of individual or groups of items. The area scans are then automatically analyzed to locate the label frames and automatically read the information about each item.

The information read from the label may then be directly printed for sorting, classification, or handling use. The information may also be stored in the computer for use in other applications such as dispatch load planning, storage planning, new data entry and registration, and arrival notification. The information may be also used to verify or Analyze computerized records.

VARIATIONS IN FRAMED LABEL DESIGN

The encoded label design may be varied in a number of ways depending on the requirements of the particular application.

The total size of the encoded label may be increased or decreased to accommodate the material being labeled. Preferably the frame and the number of identification marks or rings are made to vary appropriately to allow for the required number of distinct units to be differentiated in the scanning procedure or to allow the addition of error checking or correcting information as appropriate to the application requirements.

Designs may be scaled up or down as appropriate to maintain the distinguishability of the frame and identification when increasing or decreasing the field of view to take in more or less labels in a single image.

In addition to rings or characters or ovals or circles of a single color on a common background color, additional colors may be used to provide additional distinctiveness to the outside frame or to increase the range of distinct values; for example, using four colors of rings, including the background, allows use of base four numbering for rings.

Frames may be preprinted separately from the identification codes and the identification codes printed later. FIG. 10 shows an example of a preprinted label carrying just a border according to this invention comprising a frame of open and closed ovals which surrounds a blank information-carrying space. Information-carrying indicia of any desired form may be added by the user at the time of use more particularly at the time of item classification.

In addition to the preferred two dimensional array, the information bearing indicia may be organized as a one dimensional array of information (preferably using "Latin Square" style linear spatial repetition).

Preprinted frames may have guidemarks—like crop marks —added to aid later positioning of identification codes within the frame.

In addition to standard English alphabetic characters, characters from other symbol sets or icons such as Chinese characters, Katakana characters, or the Cyrillic alphabet, or the or Gothic character set, could be used for spatial marking codes.

The oval or circular frames around the alphanumeric identification could be coded in other patterns of filled and non-filled ovals or circles to provide additional information such as identification checksums or manufacturer.

Further design variation may be accomplished by using other shapes for the control frame of the label. For example, a dashed pattern could be used for an outer control ring on a circular code. Another example could be the use of diamond patterns in the frame around the alphanumeric identification.

Multiple partial or complete Latin Square layout rules may be used for the spatial layout of identification codes and may be indicated by, for example, use of a special character in the identification code or by the specific frame being used. A Latin Square spatial distribution can also be applied to a replicated linear array of indicia.

Image capture need not be restricted to a camera of the type described. For example one could equip numerous individuals with photographic cameras on stock-taking day to photograph every item in every company warehouse, and later on, scan the images. XY CCD camera chips of sufficient resolution are becoming more readily available and then a flash illumination system may be preferred in field data capture situations.

Image analysis need not be restricted to computers in which information is represented in digital electrical form. The principles of optical computers lend themselves to image processing of this type.

Finally, it should be noted that a number of other variations upon the principles of this invention or other embodiments of it still lie within the scope of this invention as set forth in the following claims.

We claim:

1. An identification system for identifying each of a plurality of items, comprising:

a plurality of machine-readable labels, each of said labels being capable of being applied to one of the items and comprising a substrate carrying contrasting indicia on at least one surface, said contrasting indicia including at least one distinctive marking which defines a frame of reference for an area containing an adjoining information-holding field, said information-holding field containing a plurality of information-carrying indicia, and wherein at least one of (a) said distinctive marking, (b) said information carrying indicia, and (c) further indicia on the substrate, comprises orientation indicia indicating an orientation of the label, machine vision equipment to view an image containing a plurality of the items with the labels applied thereto, conversion means to convert the image to machine readable form, and processing means to process the thus-converted image.

2. An identification system as claimed in claim 1, in which said distinctive marking is selected from the group consisting of at least one arcuate marking, a plurality of alphanumeric characters, a plurality of ovals, a plurality of triangles, a plurality of marks, and a combination thereof.

3. An identification system as claimed in claim 2, in which said distinctive marking comprises a plurality of indicia forming at least one distinctive sequence arranged in an enclosing shape.

4. An identification system as claimed in claim 1, in which the orientation indicia comprise at least one compact indicium having an appearance distinct from those used in the distinctive marking.

5. An identification system as claimed in claim 2, wherein said information-holding field contains an array of replicated said information-carrying indicia selected from the group consisting of alphanumeric characters, distinctive symbols, marks and multiple code sets.

6. An identification system as claimed in claim 5, wherein said information bearing indicia are replicated within the array in the form of an at least partial Latin Square.

7. A method of identifying each of a plurality of items at a site, comprising the steps of: labelling each of the items with a machine-readable label, said label carrying contrasting indicia compatible with machine vision equipment, wherein said indicia include at least one distinctive marking which constitutes a frame of reference defining an area containing an adjoining information-holding field, and said information-holding field contains information-carrying indicia relevant to its respective item, recording at least one image containing a plurality of the labelled items at the site, converting the at least one image into a computer-compatible form, applying machine vision algorithms to detect the presence and position of each distinctive marking within each image, computing the location of each adjoining information-holding field, assessing the rotational orientation of each label by means of orientation-indicating indicia contained in at least one of the distinctive marking, the information-carrying indicia or further indicia, and detecting and decoding the information-carrying indicia to identify each of the items.

8. A method as claimed in claim 7, further wherein said information-holding field of each said label contains an array of information-carrying indicia which is replicated in the form of an at least partial Latin Square, and using the replicated information to verify and, if required, to correct the decoded information from the information-holding field.

9. A method of identifying each of a plurality of items at a site, comprising the steps of:

labelling each of said items with a substantially unique machine-readable label, said label carrying a data matrix data field readable by machine vision reading equipment, said data matrix data field containing information-carrying indicia, and an area of the field of view able to be read by said machine vision reading equipment containing a plurality of said labels, recording at least one image of the area of the field of view able to be read by said machine vision reading equipment, converting the image into a computer-compatible form, applying machine vision algorithms to detect the presence and position of each distinct data field within the image, and decoding the information-carrying indicia in each data field in order to identify each of the items.

10. A method of identifying as claimed in claim 9, wherein each said label has an area which is substantially less than the field of view area.

11. A method of identifying as claimed in claim 10, wherein a plurality of said labels are positioned in the field of view area.

12. A method of identifying as claimed in claim 11, wherein said plurality of labels comprises at least five labels.

* * * * *